Figure 1:
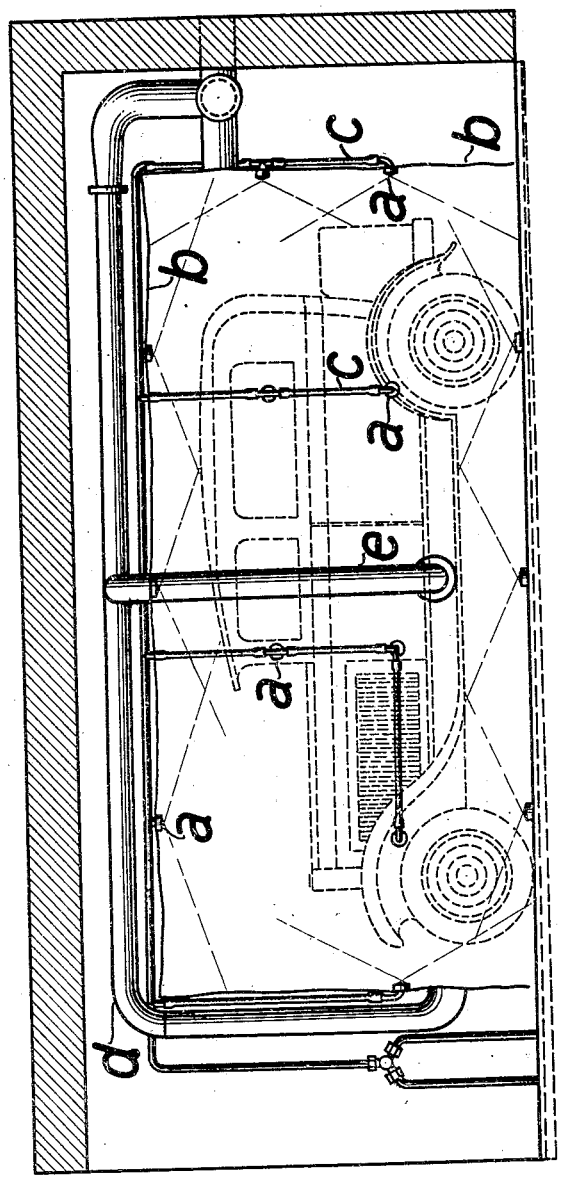

June 20, 1933.   H. GORKE ET AL   1,914,739
DEVICE FOR CLEANING VEHICLES
Filed June 16, 1930    2 Sheets-Sheet 1

Inventors:
Herbert Gorke,
Carl Neuhaus
By Byrnes Townsend & Potter,
Attorneys.

June 20, 1933.  H. GORKE ET AL  1,914,739
DEVICE FOR CLEANING VEHICLES
Filed June 16, 1930   2 Sheets-Sheet 2
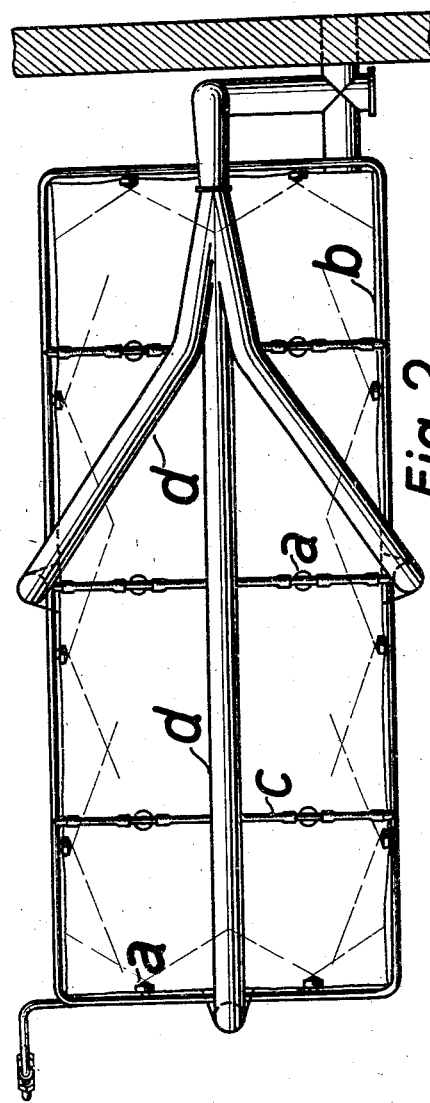
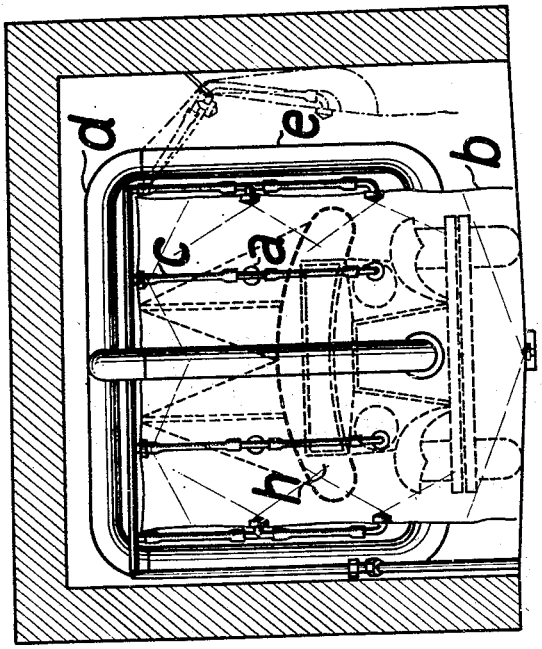

Patented June 20, 1933

1,914,739

UNITED STATES PATENT OFFICE

HERBERT GORKE, OF LEVERKUSEN-ON-THE-RHINE, AND CARL NEUHAUS, OF OPLADEN, GERMANY

DEVICE FOR CLEANING VEHICLES

Application filed June 16, 1930, Serial No. 461,586, and in Germany June 24, 1929.

This invention relates to apparatus for cleaning vehicles and particularly to apparatus by which the cleaning and drying of the vehicles is accomplished automatically after the operation of the apparatus has been initiated.

The principal object of the present invention is the provision of automatically operating apparatus for cleaning vehicles which is small and compact, simple and inexpensive to construct and install, which is simple and efficient in operation and which, therefore, is particularly adapted for use by individuals who desire to wash their own vehicles. The apparatus is also adapted for use in commercial garages where a minimum of labor is available for the washing of vehicles.

Other objects of the invention will appear from the following description taken in connection with the appended drawings, wherein:

Fig. 1 is a side elevational view of the apparatus, with dotted lines indicating a vehicle in its proper position in the apparatus, Fig. 2 is a top plan view, and Fig. 3 is an end elevational view with an open vehicle shown in dotted lines and an attachment used therewith also shown.

A flexible, imperforate curtain $b$ of waterproof material is suspended from the ceiling of the garage in which the apparatus is installed and is adapted to cooperate with the garage floor to completely enclose the vehicle (indicated in dotted lines) to be cleaned. Mounted in the top and side walls of the curtain are a plurality of nozzles $a$ which extend into the chamber and are disposed to spray fluid on all the exterior portions of the vehicle body. A series of pipes $c$ are connected to the nozzles $a$ for supplying cleaning fluid thereto, the portions of the pipes $c$ adjacent the walls being formed of soft, flexible material, whereby the vehicle will not be dented or scratched if the pipes $c$ strike against it during the operations.

A plurality of conduits $d$ are mounted above the curtain $b$ and are provided with flexible, branched portions $e$ which open into the chamber through the side and end walls. The conduits $d$ are connected to a blower (not shown) which supplies a drying gas, such as warm air, to the conduits $d$ and $c$ by which the gas is directed against the vehicle to dry the same.

A control mechanism (not shown) is mounted near the chamber and is connected with the fluid pipes and the blower whereby it controls the operation of both. The control mechanism (not shown) is adapted to be manually actuated to initiate the supply of cleaning fluid. After the cleaning fluid has been sprayed against the vehicle for a predetermined time, the control mechanism is effective to cut off the supply of cleaning fluid and to thereafter energize the blower to blow drying gas against the vehicle for a predetermined time.

Where vehicles of the open or partially open type are to be cleaned, it is necessary to cover the top of the vehicle to prevent the wetting of the interior of the vehicle. For this purpose, an air-filled cushion $h$ is provided, as shown in Fig. 3, which cushion is suspended from the ceiling of the garage by a suspension device. The suspension device may be interconnected with the control mechanism whereby the washing operation cannot be initiated until the cushion has been put in place on the vehicle.

Thus it will be seen that the invention provides apparatus by which a vehicle owner may effect the washing of vehicles with the minimum of time and labor. It is necessary for the vehicle owner only to drive the vehicle into the garage, lower the curtain over the vehicle and operate the control mechanism to initiate the cleaning operation after which, the cleaning and drying proceeds automatically.

We claim:

1. Apparatus for the individual, stationary cleaning of vehicles comprising, an imperforate, flexible curtain member defining a cleaning chamber, a nozzle mounted on said curtain member and extending into said chamber and means including a flexible pipe mounted on said curtain member for supplying fluid to said nozzle.

2. Apparatus for the individual, stationary cleaning of vehicles comprising, an imperforate member defining a cleaning chamber, means including nozzles carried on said member and directed into said chamber for spraying a cleaning fluid against the vehicle to be cleaned and means including flexible conduits opening into said chamber for blowing a drying gas against the vehicle.

3. Apparatus for cleaning vehicles comprising, an imperforate member defining a cleaning chamber, means for spraying a cleaning fluid against said vehicle, and means including a flexible inflatable cover member for covering the top side of vehicles of the open type to thereby prevent the entrance of cleaning fluid into the interior of the vehicle.

In testimony whereof, we affix our signatures.

HERBERT GORKE.
CARL NEUHAUS.